United States Patent [19]
Luebke et al.

[11] Patent Number: 5,851,944
[45] Date of Patent: Dec. 22, 1998

[54] PROCESS FOR PERFORMING A SWING BED REGENERATION OPERATION WITH MINIMAL DOWNSTREAM UPSETS

[75] Inventors: Charles P. Luebke, Mount Prospect; William A. Leet, Napervile; Joseph E. Zimmermann, Arlington Heights; Ronald J. Vangelisti, Marseilles; Terry L. Marker, Warrenville, all of Ill.

[73] Assignee: UOP LLC, Des Plaines, Ill.

[21] Appl. No.: 742,021

[22] Filed: Nov. 1, 1996

[51] Int. Cl.⁶ .............................. B01J 20/34; B01J 38/48; B01J 38/52
[52] U.S. Cl. ................................................. 502/22; 502/33
[58] Field of Search .................................. 502/20, 22, 33; 568/694

[56] References Cited

U.S. PATENT DOCUMENTS 5,300,715  4/1994  Vora ........................................ 585/254

*Primary Examiner*—Gary P. Straub
*Assistant Examiner*—Alexander G. Ghyka
*Attorney, Agent, or Firm*—Thomas K. McBride; Frank S. Molinaro; Maryann Maas

[57] ABSTRACT

A process for regenerating solid treating particles contained in at least two vessels of a swing bed regeneration operation where the effluent of the regeneration operation is maintained regeneration fluid-free and at a substantially constant flowrate has been developed. The swing bed regeneration operation involves at least two vessels, one of which is on-line treating process fluid, and the other is off-line for regeneration. At least a portion of the process fluid effluent from the vessel on-line is conducted to a displacement surge drum. The flowrate of the process fluid effluent from the displacement surge drum is controlled so that downstream units receive a substantially constant flowrate. A portion of the process fluid effluent from the displacement surge drum or a portion of the process fluid effluent from the vessel on-line is periodically used to displace regeneration fluid from the vessel off-line, and during the displacement, the flowrate of effluent from the displacement surge drum is increased to provide additional flow to the vessel off-line without having to reduce the flow to downstream units. In a specific embodiment, both process fluid and regeneration fluid are conducted to the displacement surge drum. The process fluid is used as described above. The regeneration fluid is used to displace process fluid from the vessel that is off-line prior to regeneration of the treating particles. In another specific embodiment, the treating particles are rinsed prior to regeneration to desorb and recycle any adsorbed reactant.

10 Claims, 3 Drawing Sheets

PROCESS FOR PERFORMING A SWING BED REGENERATION OPERATION WITH MINIMAL DOWNSTREAM UPSETS

BACKGROUND OF THE INVENTION

The present invention provides a process of performing a swing bed regeneration operation that prevents downstream or recycle units from experiencing large fluctuations in flowrate or contamination with regeneration fluid. A swing bed regeneration operation involves at least one treating vessel that is operating on-line and at least one additional treating vessel that is off-line for regeneration. When the treating vessel operating on-line becomes spent, the regenerated vessel is brought on-line while the spent vessel is taken off-line. The spent vessel, now off-line, is regenerated, and the operation continues.

Traditionally, after regeneration of the off-line vessel is complete, a portion of the effluent from the vessel on-line is used to displace regeneration fluid from the off-line regenerated vessel. The regeneration fluid may be a rinse solution, wash solution, or the regenerant itself, whichever was last introduced to the vessel. The displacement step is necessary so that when the regenerated vessel is brought back on-line, the immediate effluent does not contain regeneration fluid, for if regeneration fluid were present in the effluent, it may harm or upset downstream or recycle units. However, in diverting a portion of the effluent from the on-line vessel to displace regeneration fluid from the off-line vessel, the flowrate of effluent to downstream or recycle units is decreased for the duration of the displacement. As much as ten to twenty percent of the effluent from the on-line vessel is typically diverted to perform the displacement resulting in a ten to twenty percent decrease in flowrate to downstream or recycle units. In some processes, the regeneration must be performed daily thereby causing the flowrate to drastically change every day. The downstream or recycle units may suffer significant upsets as a result of the periodic fluctuation of the flowrate.

To prevent the flowrate of effluent to downstream or recycle units from fluctuating while also preventing regeneration fluid from contaminating the effluent from the regeneration operation, the present invention requires a displacement surge drum to be installed between the effluent output of the vessel on-line and the fluid input of the vessel off-line. The flowrate of effluent from the displacement surge drum is controlled so that the overall flowrate from the regeneration operation remains stable. The composition of the effluent conducted to downstream units also remains stable since any regeneration fluid present in a regenerated vessel is displaced with process fluid prior to the vessel being brought on-line. This invention is especially useful when the solid treating particles require frequent regeneration that would otherwise result in frequent process upsets.

SUMMARY OF THE INVENTION

The purpose of the invention is to provide a process for regenerating solid treating particles contained in at least two vessels of a swing bed regeneration operation where the effluent of the regeneration operation is maintained regeneration fluid-free and at a substantially constant flowrate. The swing bed regeneration operation involves at least two vessels, one of which is on-line treating process fluid, and the other is off-line for regeneration. At least a portion of the process fluid effluent from the vessel on-line is conducted to a displacement surge drum. The flowrate of the process fluid effluent from the displacement surge drum or a portion of the effluent from the vessel on-line is controlled so that downstream units receive a substantially constant flowrate. A portion of the process fluid effluent from the displacement surge drum is periodically used to displace regeneration fluid from the vessel off-line, and during the displacement the flowrate of effluent from the displacement surge drum is increased to provide additional flow to the vessel off-line without having to reduce the flow to downstream units.

A specific embodiment of the invention is one where both process fluid and regeneration fluid are conducted to the displacement surge drum. The process fluid is used as described above. The regeneration fluid is used to displace process fluid from the vessel that is off-line prior to regeneration of the treating particles. Another specific embodiment of the invention is one where the treating particles are rinsed prior to regeneration to desorb and recycle any adsorbed reactant.

DETAILED DESCRIPTION OF THE INVENTION

Figure 1:
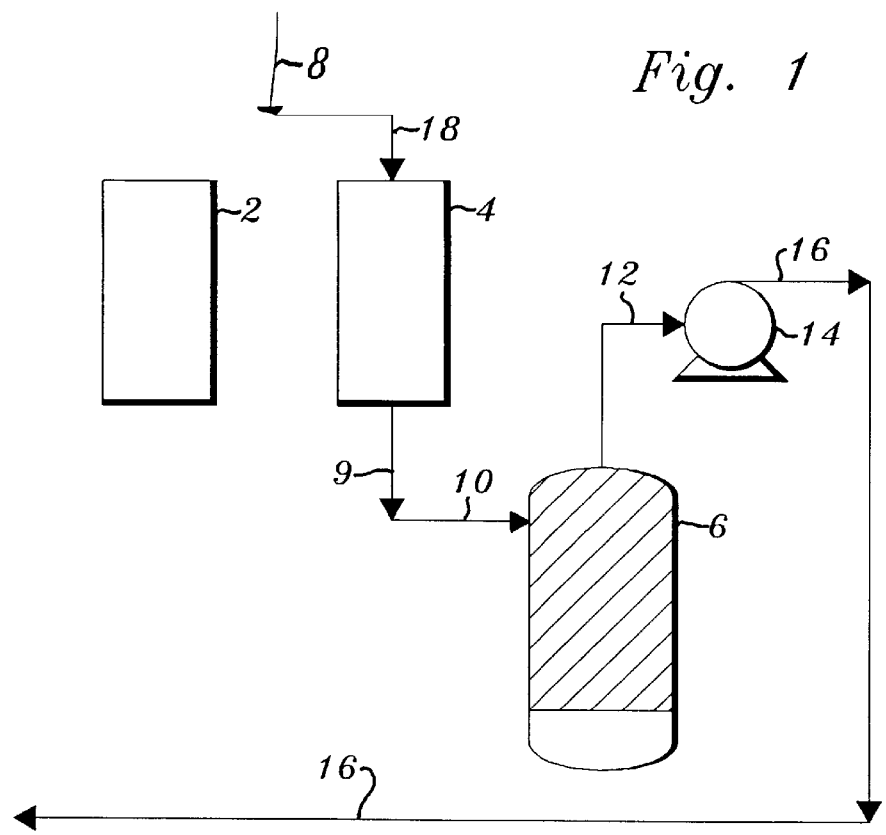
FIGS. 1–6 are schematic step-by-step representations of a generic ion exchange resin regeneration operation, modified and operated in accordance with the process of this invention. The drawing has been simplified by the deletion of a large number of pieces of apparatus customarily employed on a process of this nature which are not specifically required to illustrate the performance of the subject invention.

The present invention is a process for regenerating solid treating particles without causing large fluctuations in flowrate or allowing portions of regeneration fluid to contaminate the effluent that is conducted to downstream or recycle units. The invention requires that the solid treating particles be contained in at least two vessels which are operated in a swing bed mode. The solid treating particles are adsorbents, ion exchange resins, or other regeneratable material capable of treating a stream of a process, usually to remove at least one component from the stream. Adsorbents and ion exchange resins are well known, and will not be discussed in detail here. Examples of common adsorbents include activated carbon, activated alumina, minerals, clays, or other electron donor accepting materials, and examples of common ion exchange resins include strong cationic resins, weak cationic resins, strong anionic resins, and weak anionic resins.

At least one of the vessels containing the solid treating particles is on-line actively treating a process stream, while the other vessel is off-line for regeneration or on standby. To prevent significant fluctuations in flowrate or portions of regeneration fluid from contaminating the effluent, the invention requires that at least a portion of the effluent exiting the on-line vessel be directed to a displacement surge drum. The displacement surge drum has at least one inlet and one or more outlets, and of course, the drum must be constructed to withstand the operating conditions of the particular process at hand. The displacement surge drum is located downstream of the on-line vessel, but upstream of the inlet to the vessel that is off-line.

The process begins with one vessel (vessel 1) being on-line actively treating a process stream, and a second vessel, (vessel 2) being off-line. Vessel 2 is fully regenerated, but contains either regenerant, a rinse fluid, or a wash fluid. The regenerant, rinse fluid, or wash fluid is referred to herein as the "regeneration fluid." It is important that the fluid remaining in vessel 2 after the solid treating particles have been regenerated, whether that fluid is the regenerant, a rinse fluid, or a wash fluid, be immiscible with the process fluid being treated. At this time, there is no flow through vessel 2. In the preferred embodiment, the entire effluent from vessel 1 is conducted to a displacement surge drum, and the flowrate of effluent from the displacement surge drum is controlled through any commonly known means to be at a particular flowrate. The flowrate must be less than the flowrate of process fluid entering the displacement surge drum, so that a growing volume of fluid is being retained within the displacement surge drum. The entire effluent of the displacement surge drum is conducted to downstream units. The term "downstream units" as used herein is meant to include additional process units located downstream of the regeneration operation as well as recycle units or a combination of downstream and recycle units. It is also contemplated that only a portion of the effluent from vessel 1 may be conducted to the displacement surge drum, with the balance of the effluent being routed to downstream units.

To prepare vessel 2 for on-line service, the regeneration fluid contained therein must be displaced and the vessel filled with process fluid. A portion of the effluent from the displacement surge drum is diverted from downstream units and is conducted to the inlet of vessel 2. At the same time that a portion of the displacement surge drum effluent is diverted to vessel 2, the flowrate of effluent from the displacement surge drum is increased by an amount equal to the flow of effluent that was diverted to vessel 2 so that the flowrate of the portion of effluent that is conducted to downstream units remains approximately the same. Thus, downstream units do not experience a significant change in flowrate. Note that the flowrate to downstream units may actually be a small range of flowrates within an acceptable processing variance. The increased flowrate exiting the displacement surge drum is now greater than the flowrate of process fluid entering the displacement surge drum, so that the volume of process fluid retained within the displacement surge drum is decreasing. The volume of the displacement surge drum, and the flowrates of effluent portions conducted to downstream units and to vessel 2 are set so that the displacement is complete before the displacement surge drum is emptied. In this embodiment, the displaced regeneration fluid is routed to disposal or recovery. Alternately, a portion of the effluent from vessel 1 that is not routed to the displacement surge drum may be diverted from downstream units and conducted to the inlet of vessel 2. As before, at the same time that a portion of the vessel 1 effluent is diverted to vessel 2, the flowrate of effluent from the displacement surge drum is increased by an amount equal to the flow of effluent that was diverted to vessel 2 so that the flowrate of the portion of overall effluent that is conducted to downstream units remains approximately the same.

When the displacement is complete, the diversion of a portion of the displacement surge drum effluent or a portion of the vessel 1 effluent from downstream units to the inlet of vessel 2 is discontinued, and the flowrate of the displacement surge drum effluent is decreased and again controlled to its original flowrate so that downstream units continue to receive effluent at a constant flowrate. Vessel 2 now contains process fluid, and may be placed on-line for service, or may remain on standby until needed. When vessel 2 is placed on-line for service, no regeneration fluid will contaminate the effluent that is conducted to downstream units since any regeneration fluid that had been present was displaced with process fluid.

Vessel 1 is now off-line for regeneration but contains process fluid which must be displaced in order to regenerate the solid treating particles. To minimize waste, the process fluid displaced from vessel 1 should be conducted to vessel 2, which is now on-line, or directly to the displacement surge drum. The process fluid may be displaced by a rinse solution or a regenerant, or any other suitable regeneration fluid, so long as the regeneration fluid is not miscible with the process fluid. In this embodiment, the regeneration fluid for displacement is obtained from an independent source. Once the process fluid is displaced and vessel 1 contains regeneration fluid, the regeneration of the solid treating particles may begin. The steps involved in the regeneration of the solid treating particles in vessel 1 depends upon the specific process at hand and the particular adsorbent or ion exchange resin being used. Regeneration of adsorbents and ion exchange resins is well known and will not be discussed in detail here.

Another embodiment of the invention uses the displacement surge drum to maintain a constant flow of effluent from the regeneration operation without contaminating the effluent with regeneration fluid, and also to minimize the amount of regeneration fluid used by the regeneration operation. In this embodiment, the regeneration fluid displaced from a regenerated vessel is routed to the displacement surge drum to be used later to displace process stream from a spent vessel. Therefore, the displacement surge drum contains both process fluid and regeneration fluid with the relative proportions of each varying with the steps of the regeneration operation. Of course, the regeneration fluid and the process stream must be imiscible, and the displacement surge drum must have at least one inlet and two outlets.

As before, this embodiment begins with vessel 1 being on-line actively treating a process stream, and vessel 2 being off-line, fully regenerated, but containing regeneration fluid. At this time, there is no flow through vessel 2. At least a portion of the treated process fluid effluent from vessel 1 is conducted to a displacement surge drum, and the flowrate of process fluid effluent from the surge displacement drum is controlled through any commonly known means to be a particular set flowrate before being conducted to downstream units. The set flowrate must be less than the flowrate of process fluid entering the displacement surge drum, so that a growing volume of treated process fluid is being retained within the displacement surge drum. At this time, there is little regeneration fluid contained in the displacement surge drum. At the end of this step, the displacement surge drum will be largely filled with treated process fluid and only a small amount of regeneration fluid. As in the previous embodiment, a portion of the treated process fluid from vessel 1 may be routed directly to downstream units.

To prepare vessel 2 for on-line service, the regeneration fluid contained therein must be displaced and the vessel filled with process fluid. A portion of the process fluid effluent from the displacement surge drum or a portion of the effluent from vessel 1 is diverted from downstream units and is conducted to the inlet of vessel 2. At the same time that a portion of the displacement surge drum effluent is diverted to vessel 2, the flowrate of process fluid effluent from the displacement surge drum is increased by an amount equal to that which was diverted to vessel 2 so that the flowrate of the portion of effluent that is conducted to downstream units remains at the same value. Thus, downstream units do not experience a change in flowrate. The flowrate exiting the displacement surge drum is now greater than the flowrate of process fluid entering the displacement surge drum, so that the volume of process fluid retained within the displacement surge drum is decreasing. The volume of the displacement surge drum, and the flowrates of the effluent portions conducted to downstream units and to vessel 2 are set so that the displacement is complete before the displacement surge drum is empty of process fluid. The displaced regeneration fluid from vessel 2 is routed to the displacement surge drum. During this displacement step, as the amount of process fluid in the displacement surge drum decreases, the amount of regeneration fluid will increase. Therefore, the overall volume of fluid in the displacement surge drum stays the same, with only the relative concentration of process fluid and regeneration fluid changing. At the end of this step, the displacement surge drum will contain largely regeneration fluid with little process fluid.

When the displacement of regeneration fluid from vessel 2 is complete, the diversion of a portion of the displacement surge drum process fluid effluent or vessel 1 effluent from downstream units to the inlet of vessel 2 is discontinued, the flowrate of the displacement surge drum effluent is decreased and again controlled to its original flowrate so that downstream units continue to receive process fluid effluent at a constant flowrate, and the routing of displaced regeneration fluid to the displacement surge drum is discontinued. Vessel 2 now contains process fluid, and may be placed on-line for service, or may remain on standby until needed. When vessel 2 is placed on-line for service, there will be no contamination of the effluent that is conducted to downstream units since any regeneration fluid that had been present was displaced with process fluid.

Vessel 1 is now off-line for regeneration, but it contains process fluid which must be displaced with regeneration fluid before the treating particles in vessel 1 can be regenerated. A second displacement surge drum effluent stream is used to conduct regeneration fluid from the displacement surge drum to vessel 1 at a set flowrate. The regeneration fluid displaces the process fluid from vessel 1, and the displaced process fluid is conducted either to vessel 2 or directly to the displacement surge drum. Since the flowrate of the regeneration fluid exiting the displacement surge drum and the flowrate of the displaced process fluid entering the displacement surge drum is the same, the overall volume of fluid in the displacement surge drum remains the same, only the relative concentration of each fluid will change. At the end of this step, the displacement surge drum will contain largely process fluid with little regeneration fluid and vessel 1 is being regenerated.

The process continues in this manner, providing a contaminant-free effluent at a substantially constant flowrate to downstream units as well as conserving regeneration fluid. The amount of regeneration fluid conserved may be significant considering at least one vessel-volume of regeneration fluid is conserved each time a vessel is regenerated. When regeneration is required on a frequent basis, the overall conservation of regeneration fluid greatly increases.

Yet another embodiment of the invention is designed to additionally conserve reactant. In some processes, a portion of a reactant found in a process stream being treated may be adsorbed onto the solid treating particles. By adding a rinse step after a spent vessel is taken off-line, but prior to the regeneration of the particles in the vessel, adsorbed reactant may be recovered and recycled to the reactor. The rinse solution must act as a desorbent for the adsorbed reactant, and preferably be miscible with the regeneration fluid. If the rinse solution is selected so that it is also a component of the feed to the reactor, then the rinse solution containing the desorbed reactant may be recycled to the reactor without any further treatment. However, if the rinse solution is not a component of the feed to the reactor, or if excess rinse solution is required to desorb the reactant, the rinse solution may be partially or substantially separated from the desorbed reactant using any conventional means such as fractionation.

One example of a process where this embodiment is especially valuable is in diisopropyl ether formation such as that described in U.S. Pat. No. 5,504,257. In this type of process, reactor effluent is treated using base ion exchange resin to remove acid. However, reactant isopropyl alcohol can also be adsorbed onto the base ion exchange resin. A rinse water to desorb and recycle the isopropyl alcohol prior to the regeneration of the base ion exchange resin would conserve isopropyl alcohol reactant and increase the ultimate diisopropyl ether yield.

Without intending any limitation of the scope of the present invention, and as merely illustrative, the invention is explained below in specific terms as applied to a particular embodiment of the invention which is based on a design for a commercial scale unit. The regeneration operation is part of a diisopropyl ether production process, such as the process described in U.S. Pat. No. 5,504,257. Referring to FIG. 1, the invention begins with reactor effluent, containing mainly diisopropyl ether, with some water, isopropyl alcohol, propylene, and acid, passing through line 8 to inlet line 18 and into treating vessel 4 which is on-line. Treating vessels 4 and 2 contain base ion exchange resin to remove acid from the reactor effluent. The diisopropyl ether reactor effluent is treated in treating vessel 4, and the acid-free effluent is conducted through treater outlet line 9 to displacement surge drum inlet line 10 and into the displacement surge drum 6. Diisopropyl ether process fluid is removed from displacement surge drum 6 via line 12 using pump 14 and is conducted to downstream units including recycling to the reactor via line 16. Pump 14 is regulated so that the flowrate in line 16 is X. Note that flowrate X is less that the flowrate of diisopropyl ether process fluid entering displacement surge drum 6 via inlet line 10, so that at the end of this step of the process, displacement surge drum 6 contains 80% diisopropyl ether process fluid, represented by the cross-hatching of displacement surge drum 6. Treating vessel 2 is off-line on standby and is full of water.

Figure 2:
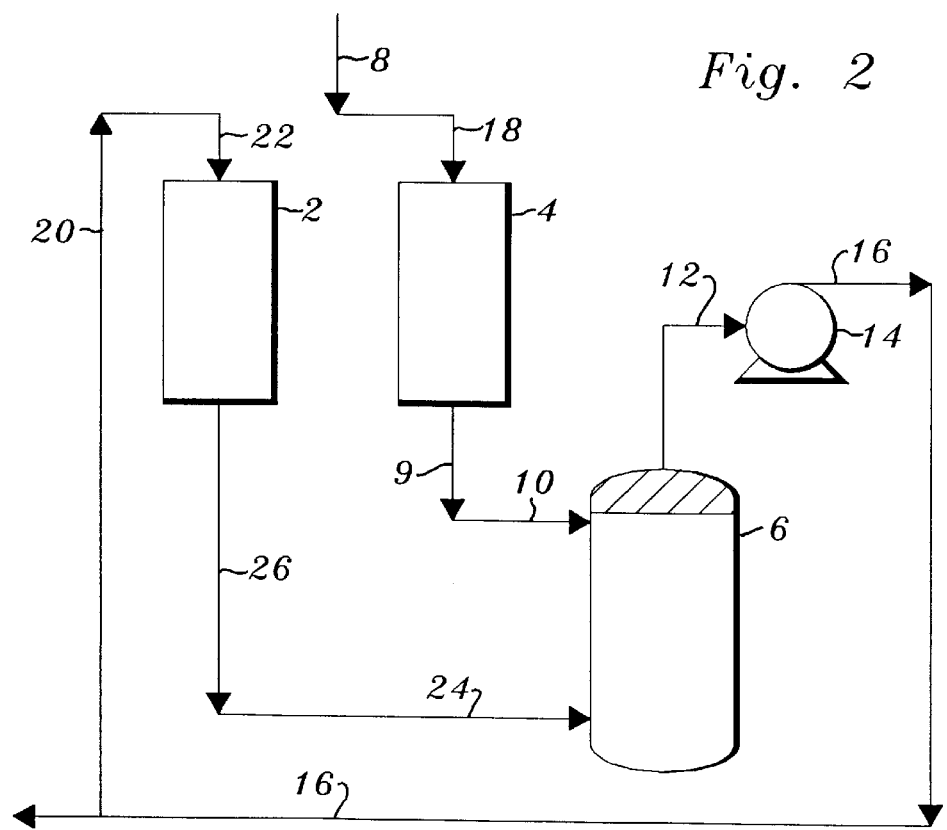

Referring now to FIG. 2, to prepare treating vessel 2 for service on-line, the water in the vessel must be displaced by diisopropyl ether process fluid. A portion of the flow in line 16 is diverted in line 20 to inlet line 22 and into vessel 2. The flowrate in line 20 is regulated to be Y, and at the same time pump 14 is regulated to conduct diisopropyl ether process fluid in line 16 at an increased flowrate of X+Y. Therefore, the net flowrate of diisopropyl ether process fluid conducted though line 16 to recycle or downstream processing units remains at X. However, since treating vessel 4 is still operating on-line as described in FIG. 1, the rate of diisopropyl ether process fluid exiting displacement surge drum 6 is greater than the rate of diisopropyl ether process fluid entering displacement surge drum 6, thereby causing the level of diisopropyl ether process fluid in displacement surge drum 6 to decrease. The displaced water from treating vessel 2 is directed out exit line 26 and conducted via line 24 into displacement surge drum 6 where it is collected thereby causing the level of water in the displacement surge drum to increase. At the end of this step of the process displacement surge drum 6 contains 80% water as shown by the portion of displacement surge drum 6 that is not cross-hatched.

Figure 3:
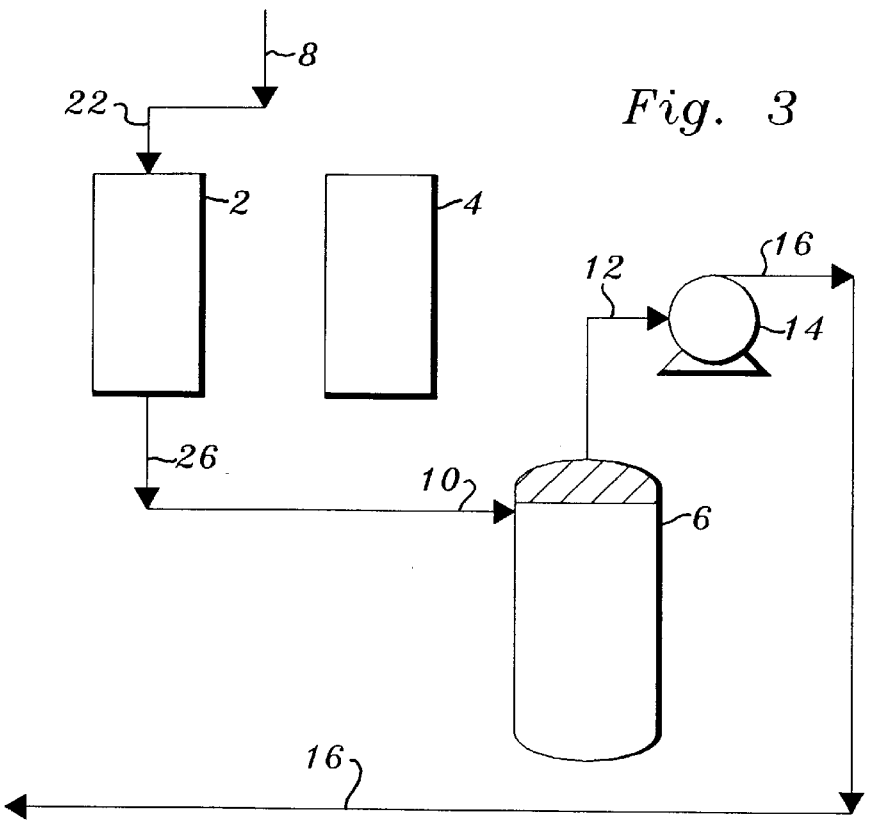

Referring to FIG. 3, treating vessel 4 which is spent and full of diisopropyl ether process fluid, it taken off-line to be regenerated. Treating vessel 2 is brought on-line with diisopropyl ether reactor effluent being conducted through line 8 to inlet line 22 and into treating vessel 2. Treated effluent from treating vessel 2 is conducted out exit line 26 and through inlet line 10 and into displacement surge drum 6. Note that at the end of the previous step, treating vessel 2 was full of diisopropyl ether process fluid, so when treating vessel 2 is brought on-line in the current step, there is no contamination of the treated process fluid ultimately carried in line 16. The flowrate of effluent to downstream units in line 16 is still maintained at flowrate X.

Figure 4:
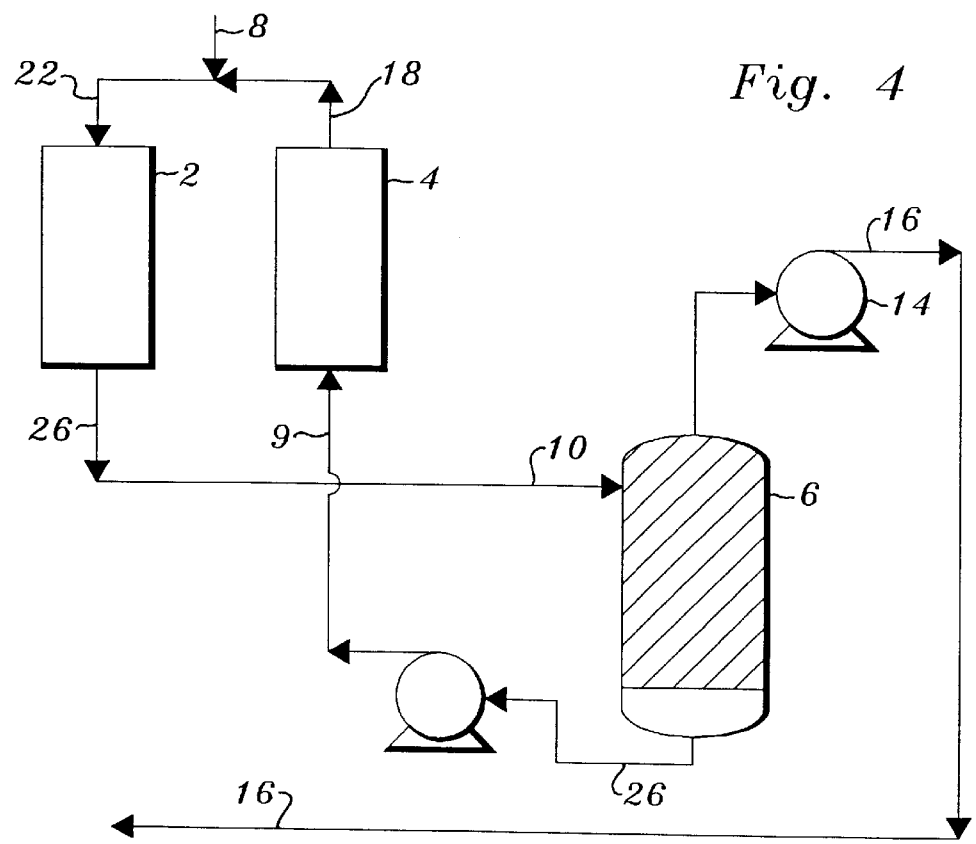

Referring to FIG. 4, water from displacement surge drum 6 is conducted through exit line 26 and is pumped through line 9 and into treating vessel 4 displacing the diisopropyl ether process fluid in treating vessel 4. The displaced diisopropyl ether process fluid is conducted through line 18 and combined with reactor effluent from line 8, and the combined fluids are directed through line 22 and into treating vessel 2. Treating vessel 2 operates as described in FIG. 3 with the exception of the additional diisopropyl ether process fluid displaced from treating vessel 4. Routing the displaced hydrocarbon to treating vessel 2 and ultimately to displacement surge drum 6 conserves diisopropyl ether process fluid and minimizes waste. At the end of this step of the process displacement surge drum 6 contains 80% diisopropyl ether process fluid as shown by the cross-hatched portion of displacement surge drum 6.

Figure 5:
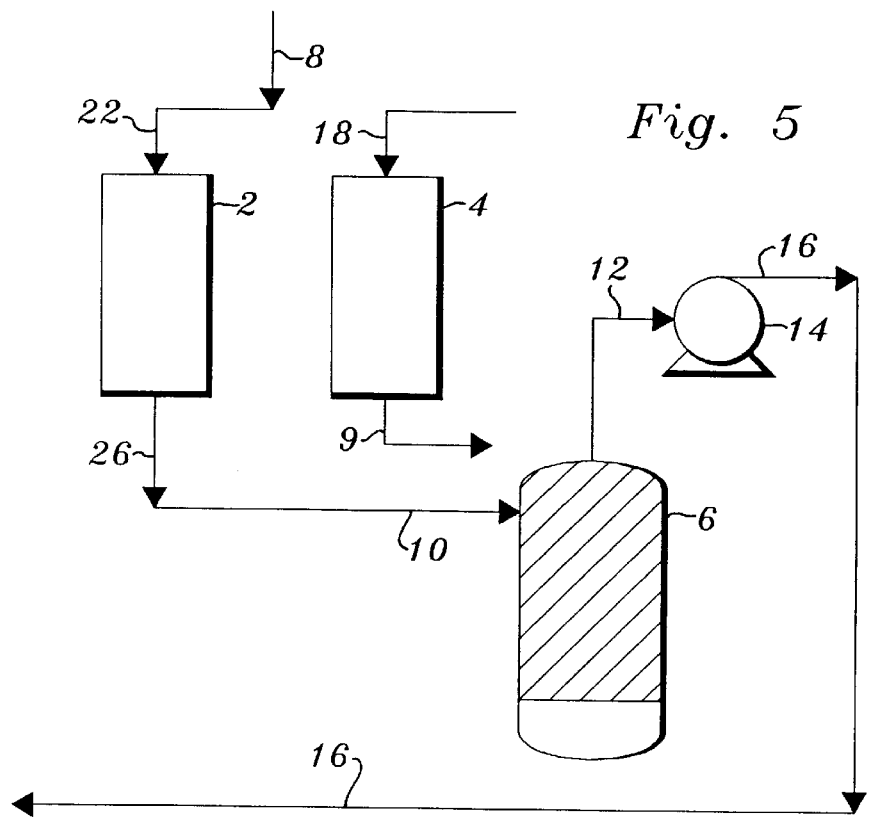

Referring to FIG. 5, Treating vessel 4 is being regenerated by introducing regeneration fluid, aqueous caustic, via line 18 and removing spent regeneration fluid via line 9. Optionally, rinse water may be passed through treating vessel 4 prior to the aqueous caustic to desorb any isopropyl alcohol that may have adsorbed onto the base ion exchange resin. The rinse water containing isopropyl alcohol may be recycled to the diisopropyl ether formation reactor, or the isopropyl alcohol may be fractionated from the water and the isopropyl alcohol portion recycled to the diisopropyl ether formation reactor thereby conserving isopropyl alcohol reactant and increasing the diisopropyl ether product yield. Upon completion of the regeneration, any spent aqueous caustic is displaced with water. Treating vessel 2 operates as described in FIG. 3

Figure 6:
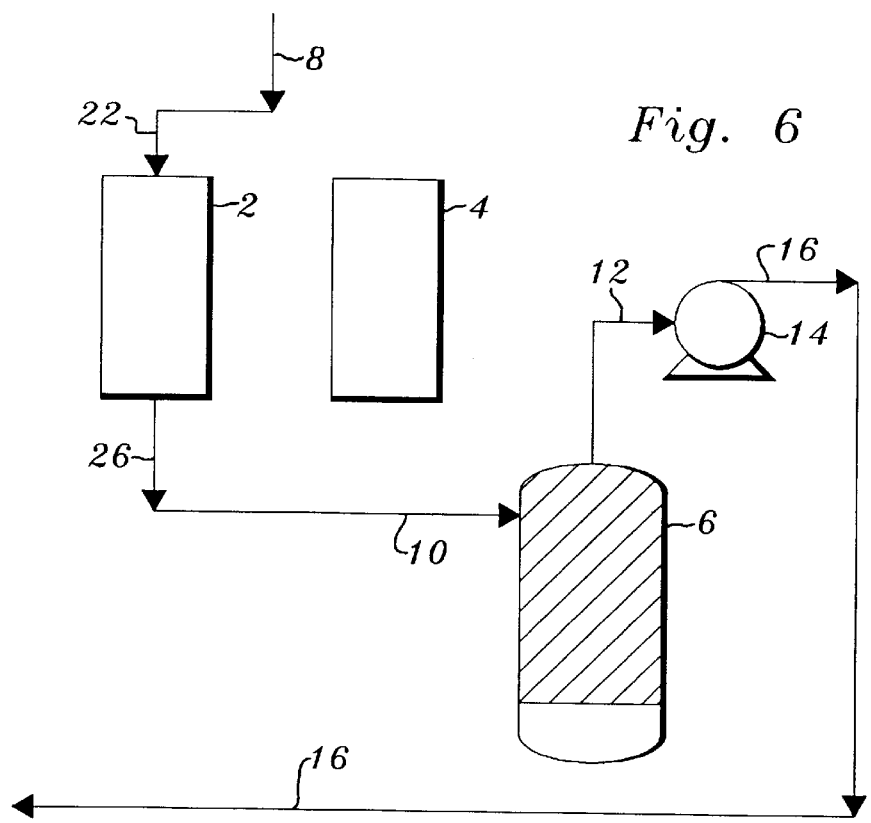

Referring to FIG. 6, treating vessel 2 continues to operate as described in FIG. 3. The regeneration of treating vessel 4 is complete, and the vessel remains off-line on standby and is full of water. The process continues in this manner, beginning again at FIG. 1, with the roles of the respective treating vessels now reversed.

It must be emphasized that the above descriptions are merely illustrative of a particular embodiment of the invention and are not intended as an undue limitation on the generally broad scope of the invention. Moreover, while the descriptions are narrow in scope, one skilled in the art will understand how to extrapolate to the broader scope of the invention. For example, operation of the invention where the process involves a reaction other than diisopropyl ether formation can be readily extrapolated from the foregoing description. Similarly, one skilled in the art would understand how the above process is applied where multiple treaters are used. Furthermore, operation of the embodiment were regeneration fluid such as water is not conducted to the displacement surge drum, but is sent to waste or recovery, would be readily determined by one skilled in the art.

What is claimed is:

1. A process for regenerating solid treating particles utilizing swing bed regeneration, said swing bed regeneration having at all times at least one vessel on-line and at least one vessel off-line, comprising:

a) conducting at least a portion of liquid effluent from said on-line vessel(s) to a displacement surge drum, said liquid effluent from said on-line vessel(s) being a diisopropyl ether production reactor effluent;

b) discharging a liquid effluent from said displacement surge drum to at least one downstream unit;

c) regenerating the solid treating particles in said off-line vessel(s) using an aqueous liquid regeneration fluid immiscible with the effluent from said displacement surge drum;

d) displacing the aqueous liquid regeneration fluid from said off-line vessel(s) using a portion of the liquid effluent from said displacement surge drum or a portion of the liquid effluent from said on-line vessel(s);

e) increasing the discharge of liquid effluent from said displacement surge drum during the displacement of aqueous liquid regeneration fluid by an amount equal to that portion of liquid effluent used for said displacement; and f) said process characterized by having said displacement surge drum at all times at least partially filled with the liquid effluent from said on-line vessel(s) and by having a substantially constant flowrate of liquid effluent from said process to said at least one downstream unit.

2. The process of claim 1 where the solid treating particles are selected from the group consisting of ion exchange resins and adsorbents.

3. The process of claim 1 further characterized by rinsing the solid treating particles in said vessel off-line with a rinse solution prior to regeneration to desorb adsorbed reactant and recycling desorbed reactant to a reactor.

4. The process of claim 3 where the the rinse solution is water.

5. A process for regenerating solid treating particles utilizing swing bed regeneration, said swing bed regeneration having at all times at least one vessel on-line and at least one vessel off-line, comprising:

a) conducting at least a portion of liquid process effluent from said on-line vessel(s) to a displacement surge drum;

b) discharging a liquid process effluent from said displacement surge drum to at least one downstream unit;

c) discharging a liquid regenerating fluid effluent, immiscible with the liquid process effluent, from said displacement surge drum to displace liquid process effluent from said vessel(s) off-line;

d) conducting the displaced liquid process effluent from said vessel(s) off-line to: i) said displacement surge drum, or ii) said vessel(s) on-line;

e) regenerating the solid treating particles in said off-line vessel(s) using liquid regenerating fluid;

f) displacing the liquid regeneration fluid from said off-line vessel(s) using a portion of the liquid process effluent from said displacement surge drum or a portion of the liquid process effluent from said on-line vessel(s);

g) increasing the discharge of the liquid process effluent from said displacement surge drum during the displacement of liquid regeneration fluid by an amount equal to that portion of liquid process effluent used for said displacement of regeneration fluid; and h) said process characterized by having said displacement surge drum at all times at least partially filled with said liquid process effluent from said on-line vessel(s) and by having a substantially constant flowrate of liquid process effluent from said process to said at least one downstream unit.

6. The process of claim 5 where the liquid process effluent from said on-line vessel(s) is a hydrocarbon and the regeneration fluid is an aqueous solution.

7. The process of claim 5 where the solid treating particles are selected from the group consisting of ion exchange resins and adsorbents.

8. The process of claim 5 where the liquid process effluent from said on-line vessel(s) is a diisopropyl ether production reactor effluent and the regeneration fluid is an aqueous solution.

9. The process of claim 5 further characterized by rinsing the solid treating particles in said vessel off-line with a rinse solution prior to regeneration to desorb adsorbed reactant and recycling desorbed reactant to a reactor.

10. The process of claim 9 where the liquid process effluent from said on-line vessel(s) is a diisopropyl ether production reactor effluent, the regeneration fluid is an aqueous solution, and the rinse solution is water.

* * * * *